United States Patent
Nagaoka et al.

(10) Patent No.: US 8,342,663 B2
(45) Date of Patent: Jan. 1, 2013

(54) RESIN COMPOSITION FOR INK SUPPLY TUBES AND INK SUPPLY TUBE

(75) Inventors: Kyosuke Nagaoka, Tokyo (JP); Akihiko Shimomura, Yokohama (JP); Toshihiko Ujita, Yokohama (JP); Takashi Fukushima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/194,118

(22) Filed: Jul. 29, 2011

(65) Prior Publication Data

US 2012/0033021 A1 Feb. 9, 2012

(30) Foreign Application Priority Data

Aug. 3, 2010 (JP) ................................. 2010-174347

(51) Int. Cl.
*B41J 2/175* (2006.01)
(52) U.S. Cl. ........................................................ 347/85
(58) Field of Classification Search .............. 347/84–86, 347/100, 88, 89; 525/92 B, 95, 98, 240, 525/333.3; 524/1, 505
See application file for complete search history.

(56) References Cited

U.S. PATENT DOCUMENTS

| | | | | |
|---|---|---|---|---|
| 5,910,540 | A | * | 6/1999 | Takahashi ................... 525/92 B |
| 7,163,980 | B2 | * | 1/2007 | Mashita et al. ................. 525/88 |
| 7,824,020 | B2 | * | 11/2010 | Saito et al. ...................... 347/85 |
| 8,227,063 | B2 | * | 7/2012 | Nagaoka et al. ................ 525/89 |

FOREIGN PATENT DOCUMENTS

| | | |
|---|---|---|
| CN | 1946558 A | 4/2007 |
| EP | 1741559 A1 | 1/2007 |
| EP | 1816086 A1 | 8/2007 |
| EP | 1832792 A1 | 9/2007 |
| JP | 09-300652 A | 11/1997 |
| JP | 2005-305878 A | 11/2005 |

* cited by examiner

*Primary Examiner* — Kristal Feggins
(74) *Attorney, Agent, or Firm* — Canon U.S.A., Inc., IP Division

(57) ABSTRACT

Provided is a resin composition which is a material for ink supply tubes and which has excellent moisture barrier performance, air barrier performance, and kink resistance. The resin composition contains a thermoplastic elastomer (A) containing a (b)-(a)-(b)-type isobutylene triblock copolymer containing polymer blocks (a) having isobutylene units and polymer blocks (b) having styrene units and also contains a lubricant (B). The content of the thermoplastic elastomer (A) in the resin composition is 70% to 95% by mass. The content of the lubricant (B) in the resin composition is 5% to 15% by mass. The content of the (b)-(a)-(b)-type isobutylene triblock copolymer in the resin composition is 50% to 95% by mass. The content of the polymer blocks (a) in the (b)-(a)-(b)-type isobutylene triblock copolymer is 80% to 90% by mass. The content of the polymer blocks (b) in the (b)-(a)-(b)-type isobutylene triblock copolymer is 10% to 20% by mass.

4 Claims, 1 Drawing Sheet

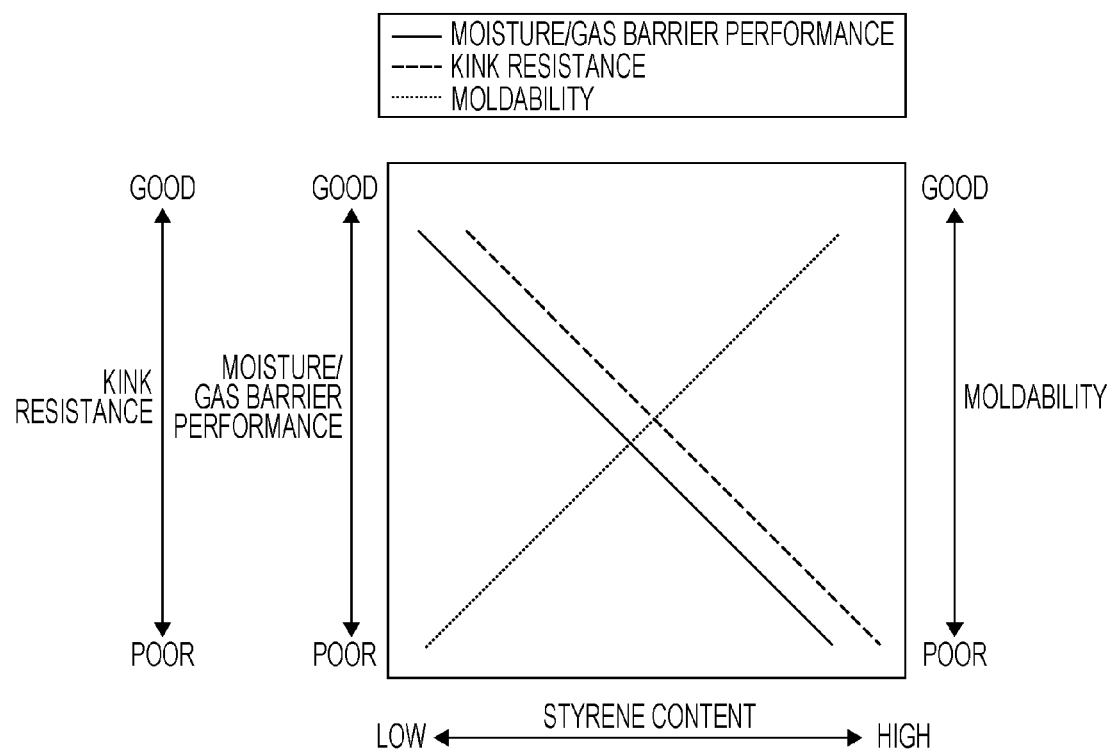

RESIN COMPOSITION FOR INK SUPPLY TUBES AND INK SUPPLY TUBE

BACKGROUND OF THE INVENTION

1. Field of the Invention

The present invention relates to a resin composition for ink supply tubes and also relates to an ink supply tube.

2. Description of the Related Art

Conventional ink jet recording apparatuses make records on recording media in such a manner that inks are ejected from ink jet recording heads. In such an ink jet recording apparatus, a carriage equipped with an ink jet recording head is moved over a recording medium in a main scanning direction and ink is ejected from the ink jet recording head while moving to perform recording. After a main scan is performed once, the recording medium is moved by a certain amount in an auxiliary scanning direction and the carriage is moved in the main scanning direction again to perform recording. A desired pattern can be recorded on the recording medium by repeating this operation.

A type of ink supply unit for use in the ink jet recording apparatus is equipped with a replaceable tank (ink tank), filled with ink, separate from the carriage. In the ink jet recording apparatus, the ink tank is connected to the ink jet recording head, which is aboard the carriage, through an ink supply tube placed therebetween such that ink is supplied to the ink jet recording head. This type is suitable for the purpose of using a relatively large amount of ink because the volume of the ink tank can be readily increased.

When the ink jet recording apparatus is used for recording, the ink supply tube, which connects the ink tank to the ink jet recording head, is pulled or twisted due to the reciprocating motion of the carriage, which equipped with the ink jet recording head, and therefore is increased in flexural rigidity. If the ink supply tube has high hardness, fatigue failure may possibly occur therein. Therefore, the ink supply tube needs to have flexibility enough to cope with reciprocation. In particular, the ink supply tube needs to cope with reciprocation with a smaller curvature and needs to have higher flexibility because of the recent downsizing of ink jet printers.

If moisture evaporates from ink present in the ink supply tube to leak out of the ink supply tube, the viscosity of the ink therein will increase. This may cause serious problems such as improper ink ejection and a reduction in print quality due to the change in composition of the ink. In addition, if gases such as air permeate through the ink supply tube, the gases will dissolve in the ink in the ink supply tube to cause a reduction in the degree of deaeration of the ink or the creation and growth of bubbles in the ink. This may possibly cause improper ink ejection and a reduction in print quality. Therefore, the ink supply tube needs to have high moisture barrier performance and air barrier performance.

Japanese Patent Laid-Open No. 9-300652 discloses an ink supply tube for ink jet recording. This ink supply tube has a layered structure consisting of an inner layer in contact with ink, an outer layer in contact with air, and an intermediate layer made of a material with low gas permeability, the inner and outer layers being made of a material having ink resistance, low permeability, and low rigidity. In particular, the inner and outer layers are made of polyethylene and the intermediate layer is made of an ethylene-vinyl alcohol copolymer or polyvinylidene chloride.

Techniques for using highly flexible thermoplastic elastomers to prepare ink supply tubes for ink jet recording are being investigated. Such thermoplastic elastomers include olefinic thermoplastic elastomers, urethane thermoplastic elastomers, ester thermoplastic elastomers, styrenic thermoplastic elastomers, and polyvinyl chloride thermoplastic elastomers. In particular, the styrenic thermoplastic elastomers have excellent flexibility and rubber elasticity. Examples of the styrenic thermoplastic elastomers include styrene-butadiene-styrene (SBS) block copolymers, styrene-isoprene-styrene (SIS) block copolymers, styrene-ethylene-butylene-styrene (SEBS) block copolymers, and styrene-ethylene-propylene-styrene (SEPS) block copolymers. In recent years, styrene-isobutylene-styrene (SIBS) block copolymers have been developed.

Japanese Patent Laid-Open No. 2005-305878 discloses a resin composition, containing a thermoplastic elastomer, for ink jet recording. In particular, the resin composition contains a styrene-isobutylene-styrene (SIBS) block copolymer, a polyolefin, and liquid polybutene and has excellent gas barrier performance, excellent moisture barrier performance, and good flexibility.

SUMMARY OF THE INVENTION

The ethylene-vinyl alcohol copolymer and polyvinylidene chloride disclosed in Japanese Patent Laid-Open No. 9-300652 have high rigidity in addition to high air barrier performance and therefore have a problem with flexibility as materials for ink supply tubes in view of bending resistance. The ink supply tube, which includes the outer layer made of polyethylene, is suitable for use in large-size printers and, however, has a problem with required flexibility for applications of small-size printers that need to operate in a reciprocating mode with a small curvature. The layered structure cannot avoid increasing costs.

Tubes made of the styrene-isobutylene-styrene (SIBS) block copolymer disclosed in Japanese Patent Laid-Open No. 2005-305878 have excellent moisture barrier performance, air barrier performance, and flexibility and are free from the above problems.

In the case of bundling five to ten tubes for the purpose of preparing connected ink supply tubes, there are concerns about an increase in carriage mass and an increase in tube reaction force. These concerns can be solved by reducing the thickness of the tubes. In this case, a material for the tubes needs to have higher moisture barrier performance, air barrier performance, and kink resistance.

An aspect of the present invention provides an ink supply tube and a resin composition for ink supply tubes. The resin composition is a material for ink supply tubes; has excellent moisture barrier performance, air barrier performance, and kink resistance; and, in the case of connecting tubular materials, enables the reduction in mass of a carriage by reducing the thickness of tubes and the suppression of an increase in tube reaction force with the moisture barrier performance, air barrier performance, and kink resistance of products maintained. The above properties as used herein refer to those of a tube with a specific inner diameter, outer diameter, and thickness. This means that in the case of reducing the thickness of an ink supply tube made of, for example, the same material as above to half with the inner diameter thereof fixed, the moisture barrier performance and air barrier performance thereof reduces to about half.

The inventors have achieved the resin composition by blending a thermoplastic elastomer containing a specific block copolymer with a lubricant component at a specific ratio.

The present invention provides a resin composition for ink supply tubes. The resin composition contains a thermoplastic elastomer (A) containing a (b)-(a)-(b)-type isobutylene triblock copolymer containing polymer blocks (a) having isobutylene units and polymer blocks (b) having styrene units and also contains a lubricant (B). The content of the thermoplastic elastomer (A) in the resin composition is 70% to 95% by mass. The content of the lubricant (B) in the resin composition is 5% to 15% by mass. The content of the (b)-(a)-(b)-type isobutylene triblock copolymer in the resin composition is 50% to 95% by mass. The content of the polymer blocks (a) in the (b)-(a)-(b)-type isobutylene triblock copolymer is 80% to 90% by mass. The content of the polymer blocks (b) in the (b)-(a)-(b)-type isobutylene triblock copolymer is 10% to 20% by mass.

Further features of the present invention will become apparent from the following description of exemplary embodiments with reference to the FIGURE.

BRIEF DESCRIPTION OF THE DRAWING

The figure is a graph illustrating the relationship between the styrene content of a styrene-isobutylene-styrene (SIBS) block copolymer and the moisture barrier performance, air barrier performance, and kink resistance.

DESCRIPTION OF THE EMBODIMENTS

A resin composition for ink supply tubes according to the present invention contains a thermoplastic elastomer (A) containing a (b)-(a)-(b)-type isobutylene triblock copolymer (A-1) containing polymer blocks (a) having isobutylene units and polymer blocks (b) having styrene units and also contains a lubricant (B). The content of the thermoplastic elastomer (A) in the resin composition is 70% by mass or more. The content of the lubricant (B) in the resin composition is 5% to 15% by mass. The content of the (b)-(a)-(b)-type isobutylene triblock copolymer (A-1) in the resin composition is 50% to 95% by mass. The content of the polymer blocks (b) in the (b)-(a)-(b)-type isobutylene triblock copolymer (A-1) is 10% to 20% by mass.

That is, the resin composition contains 70% to 95% by mass of the thermoplastic elastomer (A) and 5% to 15% by mass of the lubricant (B). The thermoplastic elastomer (A) contains the (b)-(a)-(b)-type isobutylene triblock copolymer (A-1). The (b)-(a)-(b)-type isobutylene triblock copolymer (A-1) contains 80% to 90% by mass of the polymer blocks (a), which have the isobutylene units, and 10% to 20% by mass of the polymer blocks (b), which have the styrene units. In 100 parts by mass of the resin composition, 50 parts to 90 parts by mass of the (b)-(a)-(b)-type isobutylene triblock copolymer (A-1) is present.

(A) Component (Thermoplastic Elastomer (A))

The (b)-(a)-(b)-type isobutylene triblock copolymer (A-1), which is contained in the thermoplastic elastomer (A) (hereinafter referred to as the (A) component), contains the polymer blocks (b) (hereinafter collectively referred to as the (b) component), which have the styrene units and serve as hard segments, and the polymer blocks (a) (hereinafter collectively referred to as the (a) component), which have the isobutylene units and serve as soft segments. The hard segments have a function of preventing plastic deformation (the nature of a substance that permanently deforms when strong force is applied thereto) and a function of retaining moldability. The soft segments have the ability to readily plastically deform due to external stimulation.

Examples of the (b) component include polymers of styrene and polymers of styrene derivatives such as α-methylstyrene, β-methylstyrene, p-methylstyrene, p-chlorostyrene, p-bromostyrene, and 2,4,5-tribromostyrene. In particular, the styrene polymers are inexpensive and therefore are most preferred. Styrene and the styrene derivatives may be used alone or in combination.

For the ratio of the (a) component to the (b) component in the (b)-(a)-(b)-type isobutylene triblock copolymer (A-1), the content of the (b) component in the (b)-(a)-(b)-type isobutylene triblock copolymer (A-1) is adjusted to 10% to 20% by mass in consideration of moisture barrier performance, air barrier performance, kink resistance, flexibility, and/or moldability.

When the content of the (b) component in the (b)-(a)-(b)-type isobutylene triblock copolymer (A-1) is less than 10% by mass, the resin composition has poor moldability and therefore it is difficult to form the resin composition into a tube. When the content of the (b) component in the (b)-(a)-(b)-type isobutylene triblock copolymer (A-1) is more than 20% by mass, tubes produced from the resin composition have poor moisture barrier performance, air barrier performance, and kink resistance. Therefore, in the case of connecting tubular materials, it is difficult to reduce the mass of a carriage by reducing the thickness of tubes and it is difficult to suppress the increase in reaction force of tubes with the moisture barrier performance, air barrier performance, and kink resistance of products maintained.

The content of each of the (a) and (b) components can be determined by $^1$H-NMR analysis. The mass-average molecular weight of the (b)-(a)-(b)-type isobutylene triblock copolymer (A-1) is not particularly limited and is preferably 40,000 to 150,000 and more preferably 60,000 to 130,000 in view of moldability, moisture barrier performance, and gas barrier performance.

The content of the (b)-(a)-(b)-type isobutylene triblock copolymer (A-1) in the resin composition is preferably 50% to 95% by mass and more preferably 65% to 90% by mass. When the content thereof is less than 50% by mass, the resin composition has poor moisture barrier performance and gas barrier performance. When the content thereof is more than 95% by mass, the resin composition has poor moldability and therefore it is difficult to form the resin composition into a tube.

Examples of a thermoplastic elastomer component (hereinafter referred to as the (A-2) component) other than the (b)-(a)-(b)-type isobutylene triblock copolymer (A-1) include a styrene-ethylene/butylene-styrene (SEBS) block copolymer, a styrene-isoprene-styrene (SIS) block copolymer having isoprene blocks derived from 3,4-polyisoprene, and a styrene-isoprene-styrene (SIS) block copolymer having isoprene blocks derived from 1,4-polyisoprene. In particular, the styrene-ethylene/butylene-styrene (SEBS) block copolymer is a material, having excellent moldability, for ink supply tubes. The blending of the resin composition with the styrene-ethylene/butylene-styrene (SEBS) block copolymer allows the resin composition to have improved moldability. Since the styrene-ethylene/butylene-styrene (SEBS) block copolymer is a material having relatively high moisture barrier performance and air barrier performance among styrenic thermoplastic elastomers, a small amount of the styrene-ethylene/butylene-styrene (SEBS) block copolymer is useful in improving the moldability of the resin composition with the high moisture barrier performance and air barrier performance thereof maintained.

The content of the (A-2) component in the resin composition is preferably 20% by mass or less and more preferably 15% by mass or less in view of moisture barrier performance and air barrier performance.

(B) Component (Lubricant)

In the resin composition, the lubricant (B) (hereinafter referred to as the (B) component) contains an olefinic polymer having olefin units and/or a styrenic polymer having styrene units. The (B) component is used for the purpose of allowing the resin composition to have improved moldability. The use of the (B) component allows the resin composition to have good moldability because of an improvement in fluidity and cooling rate during molding. In extrusion molding, the (B) component is necessary to keep the shape of a tube extruded from a nozzle. Examples of the olefinic polymer include, but are not limited to, ethylenic polymers and propylenic polymers. Examples of the ethylenic polymers include high-density polyethylene, medium-density polyethylene, low-density polyethylene, ultra-low-density polyethylene, ultra-high molecular weight polyethylene, linear low-density polyethylene, and ethylene-vinyl acetate copolymers. Examples of the propylenic polymers include propylene homopolymers; block copolymers derived from propylene, ethylene, and/or α-olefins; and random copolymers derived from propylene, ethylene, and/or α-olefins. These olefinic polymers may be used alone or in combination.

Examples of the styrenic polymer include general-purpose polystyrene (GPPS), high-impact polystyrene (HIPS), and polymers of styrene derivatives such as α-methylstyrene, β-methylstyrene, p-methylstyrene, p-chlorostyrene, p-bromostyrene, and 2,4,5-tribromostyrene. These polymers may be used alone or in combination. In particular, high-impact polystyrene (HIPS), which is produced by copolymerizing styrene and a rubber component, is capable of further increasing the elongation and strength of a tube as compared to styrene homopolymers.

The content of the (B) component in the resin composition is 5% to 15% by mass. When the content of the (B) component is less than 5% by mass, the resin composition has poor moldability and therefore it is difficult to extrude the resin composition into ink supply tubes. When the content of the (B) component is more than 15% by mass, tubes produced from the resin composition have low flexibility and kink resistance. Therefore, in the case of connecting tubular materials, it is difficult to reduce the mass of a carriage and it is difficult to suppress the increase in reaction force of tubes by reducing the thickness of the tubes with the kink resistance of products maintained. The melt mass flow rate (MFR) of a polymer of the (B) component is not particularly limited and is preferably 1 gram to 50 grams per 10 minutes and more preferably 0.1 gram to 30 grams per 10 minutes as determined in accordance with JIS K 7210:1999 in view of moldability.

Other Components

The resin composition may further contain various components (hereinafter referred to as the (C) components) other than the (A) component and the (B) component as required without departing from the scope of the present invention.

Examples of the (C) components include various additives such as compatibilizers, softeners, flame retardants, surfactants, blowing agents, oxidation inhibitors, anti-aging agents, and adhesives. In particular, the resin composition may contain a petroleum softener or a compound, such as paraffin oil or polybutene, serving as a compatibilizer for increasing the kneading performance of the resin composition. This compound, which serves as such a compatibilizer, has a function of imparting flexibility to a molding obtained from the resin composition. In particular, polybutene has high moisture barrier performance and gas barrier performance. Therefore, when the resin composition contains polybutene, the reduction in moisture barrier performance or gas barrier performance of the resin composition is slight. Examples of polybutene include isobutene homopolymers produced by polymerizing isobutene, which is obtained as a by-product of petroleum refining, and copolymers of isobutene and n-butene. Since the petroleum softener, paraffin oil, and polybutene reduce the tensile strength and rubber elasticity of the resin composition, it is not preferred that the resin composition contain an excessive amount of the petroleum softener, paraffin oil, or polybutene. The content of the (C) components is preferably 25% by mass or less and more preferably 15% by mass or less.

The resin composition, which contains the above-mentioned components, preferably satisfies the following inequality:

$$0.15 \leq H/(H+S) \leq 0.30 \tag{1}$$

wherein H is the content of all hard components including the (b) component in the resin composition and S is the content of all soft components including the (a) component in the resin composition on a mass basis.

As used herein, the term "soft component" refers to a component which is liquid and elastic at room temperature and which has a glass transition temperature of −30° C. or lower and the term "hard component" refers to a component which is solid and is not elastic at room temperature and which has a glass transition temperature of 30° C. or higher. In examples below, additives contained in resin moldings are each categorized into a hard or soft component and Inequality (1) is calculated.

When the value of the term H/(H+S) (hereinafter referred to as the "hard component ratio") is within the range of Inequality (1), the resin composition has good moldability and kink resistance. Therefore, in the case of connecting tubular materials, the mass of a carriage can be reduced and an increase in tube reaction force can be suppressed by reducing the thickness of tubes with the moisture barrier performance, air barrier performance, and kink resistance of products maintained. The resin composition preferably has a water vapor transmission rate of 1.5 g/m²/24 h or less as determined in accordance with JIS Z 0208 (dish method) using a 0.5 mm thick sheet at 40° C. and a relative humidity of 90% and an air permeation coefficient of $1.5 \times 10^{-10}$ cm³·cm/cm²/s/cmHg or less as determined in accordance with JIS K 7126 (differential-pressure method) using a 0.5 mm thick sheet at 23° C.

Method of Producing Resin Composition

A method of producing the resin composition is not particularly limited and the resin composition can be produced by a known method. Examples of a melt-mixing apparatus usable herein include sealed mixers such as Laboplast mills, Brabender mixers, Banbury mixers, kneaders, and roll mills; batch mixers; and continuous melt mixers such as single-screw extruders and twin-screw extruders.

The resin composition can be molded by a molding method usually used for thermoplastic resin compositions using a molding machine and can be melt-molded by, for example, extrusion molding, injection molding, press molding, or blow molding.

The resin composition has highly balanced moisture barrier performance, gas barrier performance, kink resistance, flexibility, moldability, and the like and can be used to form an ink supply tube for ink jet printers.

Examples of the present invention will now be described in detail.

Examples 1 to 8 and Comparative Examples 1 to 5

Resin compositions shown in Table 1 were prepared. Specimens for evaluation were prepared from the resin compositions and were then evaluated as described in Evaluations 1 to 4 below. The evaluation results are shown in Tables 1 and 2. Numerical values in cells corresponding to elastomers, lubricants, and a compatibilizer shown in these tables are in parts by mass.

Materials used are as described below.

(A) components
- Elastomer 1 (A-1): a styrene-isobutylene-styrene (SIBS) block copolymer having a mass-average molecular weight of about 100,000 and a styrene block content of 15% by mass.
- Elastomer 2 (A-1): a styrene-isobutylene-styrene (SIBS) block copolymer having a mass-average molecular weight of about 100,000 and a styrene block content of 30% by mass.
- Elastomer 3 (A-1): a styrene-isobutylene-styrene (SIBS) block copolymer having a mass-average molecular weight of about 100,000 and a styrene block content of 5% by mass.
- Elastomer 4 (A-1): a styrene-isobutylene-styrene (SIBS) block copolymer having a mass-average molecular weight of about 100,000 and a styrene block content of 10% by mass.
- Elastomer 5 (A-1): a styrene-isobutylene-styrene (SIBS) block copolymer having a mass-average molecular weight of about 100,000 and a styrene block content of 20% by mass.
- Elastomer 6 (A-2): a styrene-ethylene/butylene-styrene (SEBS) block copolymer having a mass-average molecular weight of about 100,000 and a styrene block content of 30% by mass.

Elastomers 1, 4, and 5 are (A-1) components and contain 80% to 90% by mass of polymer blocks (a) and 10% to 20% by mass of polymer blocks (b) having styrene units and these values are within the scope of the present invention. Elastomers 2 and 3 are (A-1) components and the contents of polymer blocks (a) and polymer blocks (b) in each of Elastomers 2 and 3 are outside the scope of the present invention. Elastomer 6 is a (A-2) component.

(B) Components
- Lubricant 1: polypropylene (PP) which is a hard component and which has a melt mass-flow rate (MFR) of 10 grams per 10 minutes.
- Lubricant 2: high-impact polystyrene (HIPS) which is a hard component and which has a melt mass-flow rate (MFR) of 3.0 grams per 10 minutes.

(C) Component
- Compatibilizer 1: polybutene which is a soft component and which has a number-average molecular weight of 1,400.

The resin compositions of Examples 1 to 8 each necessarily contain a (A-1) component having a specified mass distribution (polymer block (a): polymer block (b)=80-90%:10-20% by mass). The resin compositions of Examples 1 to 8 each contain 70% to 95% by mass of a thermoplastic elastomer which contains the (A-1) component and which is a (A) component and 5% to 15% by mass of a lubricant (B). Furthermore, the resin compositions of Examples 1 to 8 each contain 50% to 95% of the (A-1) component.

Evaluation 1: Kink Resistance

Ink supply tubes each including five bundled tubes, connected to each other, having an inner diameter of 2.5 mm and an outer diameter 4.5 mm were prepared from the resin compositions by extrusion molding. The ink supply tubes were bent to a bend radius of 35 mm and were then evaluated in accordance with standards below.
- A: an ink supply tube having no kink during bending.
- B: an ink supply tube having a kink during bending.

Evaluation 2: Moisture Permeability

Sheets with a thickness of 0.5 mm were prepared from the resin compositions, were measured for water vapor transmission rate at 40° C. and a relative humidity of 90% in accordance with JIS Z 0208, and were then evaluated in accordance with standards below.
- A: a sheet with a water vapor transmission rate of 1.5 $g/m^2/24$ h or less.
- B: a sheet with a water vapor transmission rate of more than 1.5 $g/m^2/24$ h.

Evaluation 3: Air Permeability

Sheets with a thickness of 0.5 mm were prepared from the resin compositions, were measured for air permeation coefficient in accordance with JIS K 7126, and were then evaluated in accordance with standards below.
- A: a sheet with an air permeation coefficient of $1.5 \times 10^{-10}$ $cm^3 \cdot cm/cm^2/s/cmHg$ or less.
- B: a sheet with an air permeation coefficient of more than $1.5 \times 10^{-10}$ $cm^3 \cdot cm/cm^2/s/cmHg$.

Evaluation 4: Extrusion Moldability

The resin compositions were evaluated for extrusion moldability at a constant extrusion rate by average surface roughness (Ra). There is a correlation between the extrusion rate and average surface roughness of each resin composition, that is, the average surface roughness thereof increases with the extrusion rate thereof. In order to maintain the quality of ink supply tubes, the ink supply tubes preferably have an average surface roughness of 10 μm or less. In other words, a material that can be molded at a higher extrusion rate to meet this requirement is good in moldability. The resin compositions were measured for average surface roughness (Ra) with a 5-line confocal microscope, S130, available from Lasertec Corporation. The microscope was equipped with an objective lens with a magnification of 20× and had a z-resolution of 0.2 p.m. Each resin composition was melt-kneaded in a batch kneader and was then extrusion-molded into an ink supply tube with an inner diameter of 2.5 mm and an outer diameter of 4.5 mm in such a manner that the resin composition was extruded from an extruder at an extrusion rate of 1.5 m·$min^{-1}$. The ink supply tube was evaluated in accordance with standards below.
- A: a resin composition molded into an ink supply tube with an average surface roughness (Ra) of less than 10 μm.
- B: a resin composition molded into an ink supply tube with an average surface roughness (Ra) of 10 μm or more or incapable of being extrusion-molded.

The resin compositions of Examples 1 to 8 exhibited high scores for every evaluation item. The resin compositions of Comparative Examples 1 to 5 were problematic with one or more of the evaluation items. The content of polymer blocks (b) having styrene units in a styrene-isobutylene-styrene (SIBS) block copolymer used herein correlates with the moisture barrier performance, gas barrier performance, kink resistance, and moldability as shown in the FIGURE. That is, the lower the content of the polymer blocks (b) is, the better the moisture barrier performance, gas barrier performance, and kink resistance are. The higher the content of the polymer blocks (b) is, the better the moldability is.

The resin composition of Comparative Example 1 contains more than 15% by mass (that is, 25% by mass) of a lubricant component and therefore has reduced flexibility and kink resistance; hence, in the case of connecting tubular materials, it is difficult to reduce the mass of a carriage and it is difficult to suppress the increase in reaction force of tubes by reducing the thickness of tubes with the moisture barrier performance, air barrier performance, and kink resistance of products maintained. The resin composition of Comparative Example 2 contains less than 5% by mass (that is, 3% by mass) of a lubricant component and therefore it is difficult to extrusion-mold this resin composition because this resin composition has low moldability.

The resin compositions of Comparative Examples 3 and 5 have a polymer block (b) content of more than 20% by mass (that is, 30% by mass) and therefore the ink supply tubes prepared from these resin compositions have moisture barrier performance, air barrier performance, and kink resistance.

The resin composition of Comparative Example 4 has a polymer block (b) content of less than 10% by mass (that is, 5% by mass) and therefore it is difficult to extrusion-mold this resin composition because this resin composition has low moldability.

According to the resin compositions of Examples 1 to 8 that exhibited good evaluation results, in the case of connecting tubular materials, the mass of a carriage can be reduced and an increase in tube reaction force can be suppressed by reducing the thickness of tubes with the moisture barrier performance, air barrier performance, and kink resistance of products maintained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-174347 filed Aug. 3, 2010, which is hereby incorporated by reference herein in its entirety.

What is claimed is:

1. A resin composition for ink supply tubes, containing:
a thermoplastic elastomer (A) containing a (b)-(a)-(b)-type isobutylene triblock copolymer containing polymer blocks (a) having isobutylene units and polymer blocks (b) having styrene units; and
a lubricant (B),
wherein the content of the thermoplastic elastomer (A) in the resin composition is 70% to 95% by mass, the content of the lubricant (B) in the resin composition is 5% to 15% by mass, the content of the (b)-(a)-(b)-type isobutylene triblock copolymer in the resin composition is 50% to 95% by mass, the content of the polymer blocks (a) in the (b)-(a)-(b)-type isobutylene triblock copolymer is 80% to 90% by mass, and the content of the polymer blocks (b) in the (b)-(a)-(b)-type isobutylene triblock copolymer is 10% to 20% by mass.

TABLE 1

|  | Example 1 | Example 2 | Example 3 | Example 4 | Example 5 | Example 6 | Example 7 | Example 8 |
|---|---|---|---|---|---|---|---|---|
| Elastomer 1 | 75 | 75 |  |  | 80 | 80 | 90 | 75 |
| Elastomer 2 |  |  |  |  |  |  |  |  |
| Elastomer 3 |  |  |  |  |  |  |  |  |
| Elastomer 4 |  |  | 75 |  |  |  |  |  |
| Elastomer 5 |  |  |  | 75 |  |  |  |  |
| Elastomer 6 |  |  |  |  | 10 | 10 |  |  |
| Lubricant 1 | 15 |  | 15 | 15 | 10 |  | 5 | 5 |
| Lubricant 2 |  | 15 |  |  |  | 10 |  |  |
| Compatibilizer 1 | 10 | 10 | 10 | 10 |  |  | 5 | 20 |
| Hard component ratio | 0.26 | 0.26 | 0.23 | 0.30 | 0.25 | 0.25 | 0.19 | 0.16 |
| Kink resistance | A | A | A | A | A | A | A | A |
| Moisture permeability | A | A | A | A | A | A | A | A |
| Air permeability | A | A | A | A | A | A | A | A |
| Extrusion moldability | A | A | A | A | A | A | A | A |

TABLE 2

|  | Comparative Example 1 | Comparative Example 2 | Comparative Example 3 | Comparative Example 4 | Comparative Example 5 |
|---|---|---|---|---|---|
| Elastomer 1 | 75 | 90 |  |  |  |
| Elastomer 2 |  |  | 75 |  | 80 |
| Elastomer 3 |  |  |  | 75 |  |
| Elastomer 4 |  |  |  |  |  |
| Elastomer 5 |  |  |  |  |  |
| Elastomer 6 |  |  |  |  | 10 |
| Lubricant 1 | 25 | 3 | 15 | 15 | 10 |
| Lubricant 2 |  |  |  |  |  |
| Compatibilizer 1 |  | 7 | 10 | 10 |  |
| Hard component ratio | 0.36 | 0.17 | 0.38 | 0.19 | 0.37 |
| Kink resistance | B | A | B | A | B |
| Moisture permeability | A | A | B | A | B |
| Air permeability | A | A | B | A | B |
| Extrusion moldability | A | B | A | B | A |

2. The resin composition according to claim 1, wherein the lubricant (B) contains at least one of an ethylenic polymer, a propylenic polymer, and a styrenic polymer.

3. The resin composition according to claim 1, wherein the following inequality is satisfied:

$$0.15 \leq H/(H+S) \leq 0.30 \tag{1}$$

wherein H is the content of all hard components including the (b) component in the resin composition and S is the content of all soft components including the (a) component in the resin composition on a mass basis.

4. An ink supply tube configured to connect an ink tank to a recording head to supply ink contained in the ink tank to the recording head, containing the resin composition according to claim 1.

* * * * *